(12) United States Patent
Sun et al.

(10) Patent No.: US 8,183,838 B2
(45) Date of Patent: May 22, 2012

(54) CHARGING METHOD AND SYSTEM UTILIZING THE SAME

(75) Inventors: Chein-Chung Sun, Kaohsiung (TW); Yuh-Fwu Chou, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 911 days.

(21) Appl. No.: 12/236,409

(22) Filed: Sep. 23, 2008

(65) Prior Publication Data
US 2009/0160406 A1 Jun. 25, 2009

(30) Foreign Application Priority Data

Dec. 25, 2007 (TW) ................................ 96149881 A

(51) Int. Cl.
*H02J 7/04* (2006.01)
*H02J 7/00* (2006.01)
*H02J 7/16* (2006.01)
*H02J 7/06* (2006.01)

(52) U.S. Cl. ........ 320/139; 320/129; 320/132; 320/152; 320/155; 320/164

(58) Field of Classification Search .................. 320/129, 320/139
See application file for complete search history.

(56) References Cited

U.S. PATENT DOCUMENTS

| | | | |
|---|---|---|---|
| 6,081,097 A | 6/2000 | Seri et al. | |
| 7,191,077 B2 * | 3/2007 | Mese et al. | 702/63 |
| 8,018,204 B2 * | 9/2011 | Bourilkov et al. | 320/137 |
| 2004/0222768 A1 * | 11/2004 | Moore et al. | 320/128 |
| 2005/0017683 A1 | 1/2005 | Smallwood et al. | |
| 2005/0156570 A1 * | 7/2005 | Inui et al. | 320/132 |
| 2005/0237029 A1 | 10/2005 | Takezawa et al. | |
| 2006/0176023 A1 | 8/2006 | Patino et al. | |

FOREIGN PATENT DOCUMENTS

| | | |
|---|---|---|
| JP | 8289478 | 11/1996 |
| JP | 9074691 | 3/1997 |
| JP | 9130983 | 5/1997 |
| JP | 2000152515 | 5/2000 |
| JP | 2000270491 | 9/2000 |
| JP | 2005020866 | 1/2005 |
| JP | 2005083970 | 3/2005 |
| JP | 2005151679 | 6/2005 |
| JP | 2005237155 | 9/2005 |
| JP | 2005332805 | 12/2005 |
| JP | 2005333780 | 12/2005 |
| JP | 2006344611 | 12/2006 |
| TW | 362301 | 6/1999 |
| TW | 49087 | 6/2002 |
| TW | 490871 | 6/2002 |
| TW | 200623581 | 7/2006 |
| TW | 200720904 | 6/2007 |
| WO | WO 0245238 | 6/2002 |

OTHER PUBLICATIONS

Taiwan Patent Office, Office Action, Application Serial No. 96149881, Aug. 5, 2011, Taiwan. China Patent Office, Office Action dated Sep. 9, 2010, China.
China Patent Office, Office Action, Chinese Patent Application Serial No. 200710306317.8, Sep. 9, 2010, China.

* cited by examiner

*Primary Examiner* — Edward Tso
*Assistant Examiner* — Ahmed Omar

(57) ABSTRACT

A charging method for a rechargeable battery is disclosed. A preset power is provided to the rechargeable battery when the rechargeable battery is connected to a charger for execution of a first charge process. A use state of the rechargeable battery is obtained. A first adjustable charge power is provided to the rechargeable battery when the rechargeable battery is reconnected to the charger for execution of a second charge process.

36 Claims, 2 Drawing Sheets

8,183,838 B2

CHARGING METHOD AND SYSTEM UTILIZING THE SAME

CROSS REFERENCE TO RELATED APPLICATIONS

This Application claims priority of Taiwan Patent Application No. 096149881, filed on Dec. 25, 2007, the entirety of which is incorporated by reference herein.

BACKGROUND OF THE INVENTION

1. Field of the Invention

The invention relates to a charging method, and more particularly to a charging method for rechargeable batteries.

2. Description of the Related Art

Driven by technological development, electronic product trends continue to push the envelope for lighter weights, thinner profiles and smaller volumes. Meanwhile, advanced electronic products frequently utilize rechargeable batteries to obtain power. For example, mobile electronic products, such as mobile phones or electromobiles, require rechargeable batteries to obtain power. As such, for normal operation of electronic products, an efficient charging method and system for rechargeable batteries must be implemented before the power of a rechargeable battery is exhausted.

BRIEF SUMMARY OF THE INVENTION

A charging method and system for a rechargeable battery are provided. An exemplary embodiment of a charging method for a rechargeable battery is described in the following. A preset power is provided to the rechargeable battery when the rechargeable battery is connected to a charger for execution of a first charge process. A use state of the rechargeable battery is obtained. A first adjustable charge power is provided to the rechargeable battery when the rechargeable battery is reconnected to the charger for execution of a second charge process.

Charging systems are also provided. An exemplary embodiment of a charging system comprises a power output unit, a control unit and an measurement unit. The control unit triggers the power output unit to execute a first charge process when a rechargeable battery is connected to the power output unit. The measurement unit obtains a use state of the rechargeable battery when the rechargeable battery is reconnected to the power output unit. When the use state is obtained, the control unit once again triggers the power output unit for execution of a second charge process.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
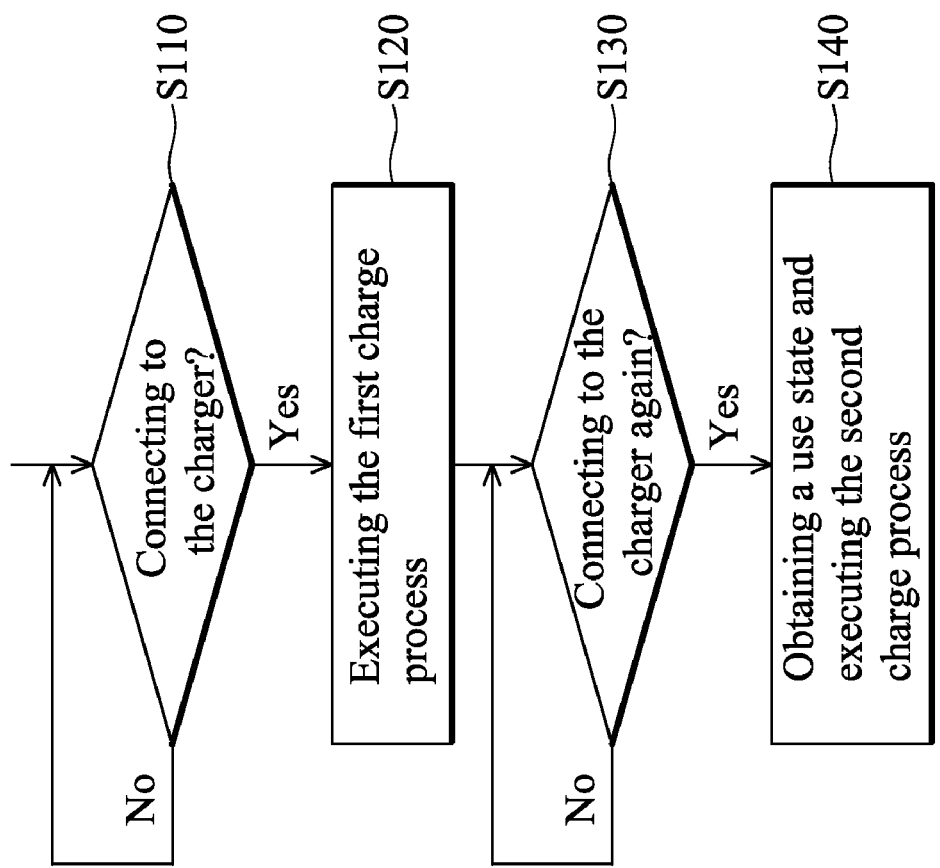
FIG. 1 is a flowchart of an exemplary embodiment of a charging method.

FIG. 1 is a flowchart of an exemplary embodiment of a charging method. First, it is detected whether a rechargeable battery is connected to a charger (step S110). If the rechargeable battery is not connected to the charger, the step S110 is continuously executed. If the rechargeable battery is connected to the charger, a preset charge power is provided to the rechargeable battery to execute a first charge process (step S120). After the first charge process, the rechargeable battery can be taken out from the charger and can be used.

The preset charge power is current or voltage. In one embodiment, if the voltage of the rechargeable battery has not arrived to a setting voltage, a fix current is utilized to charge the rechargeable battery. If the voltage of the rechargeable battery arrives to the setting voltage, a fix voltage is utilized to charge the rechargeable battery. When the capacity of the rechargeable battery increases, the charge current provided to the rechargeable battery is reduced. When the charge current provided to the rechargeable battery reaches a setting current, the rechargeable battery stops receiving the fixed voltage.

Next, it is again detected whether the rechargeable battery is connected to the charger (step S130). If the rechargeable battery is not connected to the charger, the step S130 is continuously executed. If the rechargeable battery is reconnected to the charger, a use state of the rechargeable battery is obtained and a first adjustable charge power is provided to the rechargeable battery to execute a second charge process (step S140). The use state obtained by step S140 is the duration of executing the first charge process, the remaining capacity of the rechargeable battery, the open circuit voltage (OCV) of the rechargeable battery or the internal impedance of the rechargeable battery.

In one embodiment, the first adjustable charge power is dependent upon the use state. For example, the preset charge power is dynamically adjusted according to the obtained use state. The adjusted preset charge power serves as the first adjustable charge power.

Assuming that the rechargeable battery comprises a first charge capacity after the first charge process and comprises a second charge capacity after the second charge process, when the use state of the rechargeable battery is less than a first preset level, the first adjustable charge power is utilized such that the second charge capacity exceeds the first charge capacity. Additionally, when the use state of the rechargeable battery exceeds a second preset level, the first adjustable charge power is utilized such that the second charge capacity is less than the first charge capacity. The second charge capacity is required to be higher than a minimum charge level. In this case, the first preset level can equal to the second preset level.

Additionally, during the first or the second charge process, the rechargeable battery is not continuously charged. Taking the first charge process as an example, when the first charge process is executed, the rechargeable battery is charged during a first period and the rechargeable battery is not charged during a second period. For example, when the rechargeable battery receives the preset charge power, the rechargeable battery can be charged. Thus, the duration of providing the preset charge power is dependent upon the first period, and the end of the duration of providing the preset charge power is dependent upon the second period. During the second period, the rechargeable battery is still connected to the charger. The sum of the first and the second period is the duration of executing the first charge process. Similarly, the rechargeable battery is not continuously charged during the second charge process. When the second charge process is executed, the rechargeable battery is charged during a third period and is not charged during a fourth period.

In one embodiment, the use state of the rechargeable battery can be obtained according to the duration of executing the first charge process. The duration of the third period is adjusted according to the obtained use state. For example, if the use state (the duration of executing the first charge process) exceeds a preset value, the duration of the third period is longer than the duration of the first period. If the use state is less than the preset value, the duration of the third period is shorter than the duration of the first period.

In another embodiment, the use state of the rechargeable battery can be obtained according to the duration of the first or the second period. In this case, the duration of the third period is controlled according to the obtained use state. For example, if the second period (the rechargeable battery is not charged and the rechargeable battery is connected to the charger) exceeds a preset value, it indicates that the duration of connecting to the charger is relatively longer. Thus, the third period is increased. Since the duration of the third period is determined according to the first adjustable charge power, the duration of the third period is increased when the first adjustable charge power is lower. Additionally, since the first adjustable charge power is lower, the operating lifespan of the rechargeable battery can be increased.

In some embodiments, during the period of providing the preset charge power to the rechargeable battery, if the rechargeable battery is suddenly not connected to the charger, the charge process is interrupted such that the rechargeable battery is not charged to a preset capacity. Thus, before executing the second charge process, the duration of providing the preset charge power to the rechargeable battery is detected and the third period is adjusted according to the detected result. For example, if the duration of providing the preset charge power to the rechargeable battery is less than a preset time period, then a higher charge power is provided during the second charge process to reduce the duration of the third period and increase the capacity of the rechargeable battery.

In this embodiment, the use state of the rechargeable battery is obtained in step S140. In another embodiment, the rechargeable battery is detected to have obtained a previous state before the first charge process. Thus, the first adjustable charge power provided by the second charge process is dependent upon the use state and the previous state. In this case, the first adjustable charge power is determined by a weighting average of the use state and the previous state.

The weighting average ($K_N$) is expressed by the following equation, but the disclosure is not limited thereto:

$$K_N = (a*K_{N-1} + b*C_N)/(a+b),$$

wherein a and b are positive constants, $K_{N-1}$ is the previous state, and $C_N$ is the use state.

In one embodiment, a trigger signal is detected. When the trigger signal is triggered, a maximum charge power is provided to the rechargeable battery to execute a corresponding charge process. For example, before the second charge process, if the trigger signal is triggered, the maximum charge power is served as the first adjustable charge power. In other embodiments, before the second charge process, if the trigger signal is not triggered, the first adjustable charge power is provided. If the trigger signal is triggered and the first adjustable charge power is less than a required trigger power, the maximum charge power or a higher charge power will replace the first adjustable charge power. If the trigger signal is triggered and the first adjustable charge power is higher than the required trigger power, the first adjustable charge power is still provided.

After the second charge process, if the rechargeable battery is reconnected to the charger, a new use state is detected and a second adjustable charge power is provided to execute a third charge process. Before the third charge process, if the number of trigger signal triggering reaches a preset number, the maximum charge power is served as the second adjustable charge power. After the second charge process, if the trigger signal is not triggered, the second adjustable charge power is still provided to the rechargeable battery.

When the trigger signal is triggered, a maximum charge power is provided to the rechargeable battery. The higher charge power may decrease the operating lifespan of the rechargeable battery. In one embodiment, before every charge process, the internal impedance of the rechargeable battery is detected and the maximum charge power is dynamically adjusted according to the detection result.

Figure 2:
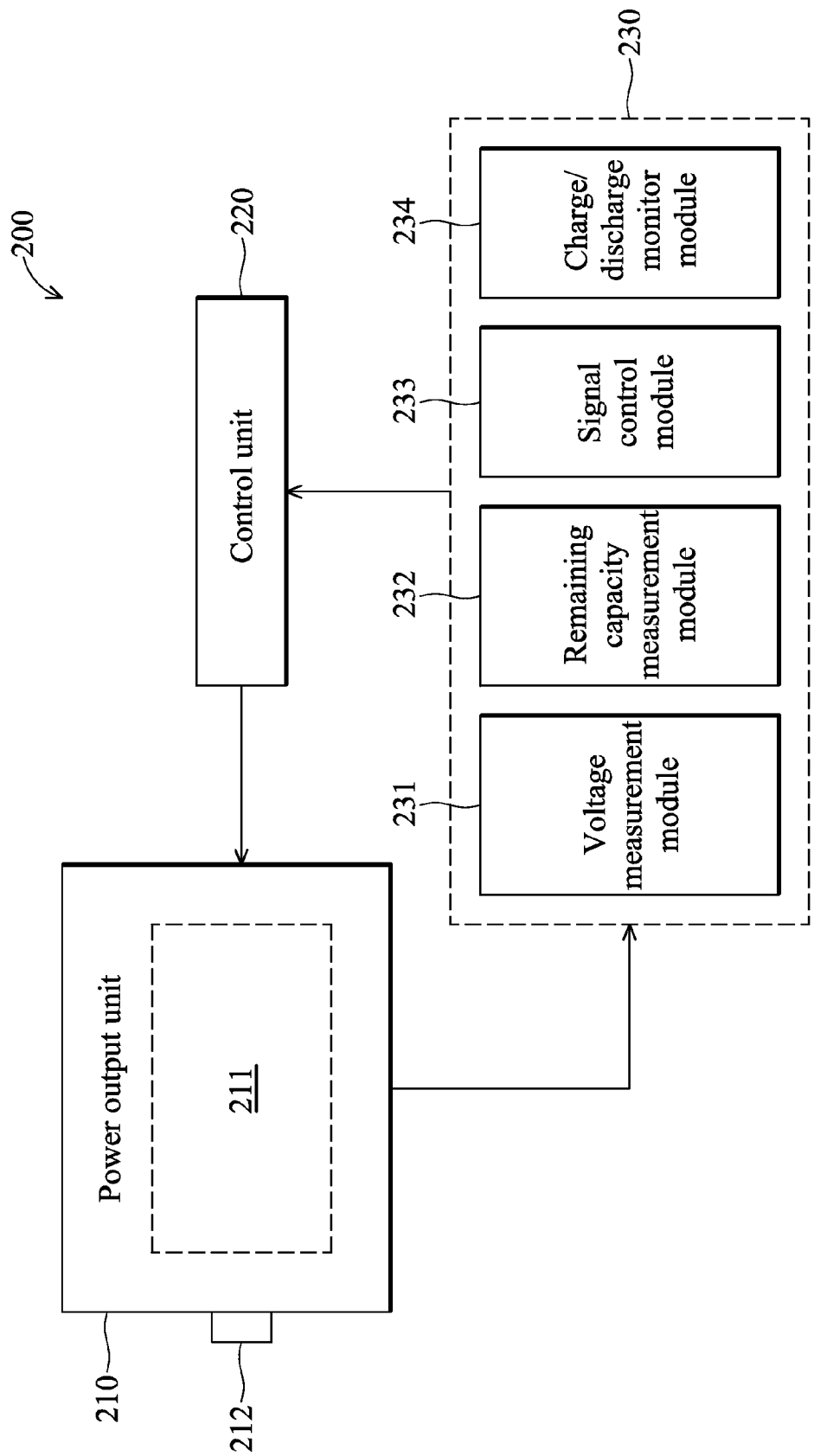
FIG. 2 is a schematic diagram of an exemplary embodiment of a charge system.

FIG. 2 is a schematic diagram of an exemplary embodiment of a charge system. The charge system 200 comprises a power output unit 210, a control unit 220 and an measurement unit 230. When a rechargeable battery is connected to the power output unit 210, the control unit 220 triggers the power output unit 210 to execute a first charge process. After the first charge process, the rechargeable battery may be taken out from the power output unit 210. Thus, when the rechargeable battery is reconnected to the power output unit 210, the measurement unit 230 detects the rechargeable battery to obtain a use state. After obtaining the use state, the control unit 220 triggers the power output unit 210 again to execute a second charge process.

In one embodiment, after the first charge process and before taking out the rechargeable battery, the control unit 220 stores the charge time or unused time of the rechargeable battery to serve as a use state of the rechargeable battery. Thus, when the rechargeable battery is reconnected to the power output unit 210, the measurement unit 220 can execute the second charge process for the rechargeable battery according to the stored use state.

As shown in FIG. 2, the power output unit 210 comprises a location 211. When the rechargeable battery is disposed in the location 211, the power output unit 210 executes the charge process for the rechargeable battery. The power output unit 210 comprises two charge modes. One charge mode is constant current and other is constant voltage. For example, in the constant current charge mode, the power output unit 210 is capable of outputting a maximum current. When the voltage of the rechargeable battery reaches a setting voltage, the power output unit 210 utilizes the constant voltage charge mode to charge the rechargeable battery. The charge current is reduced when the voltage of the rechargeable battery is increased. When the charge current is less than a setting current, the rechargeable battery is not charged.

In one embodiment, when the rechargeable battery is connected to the power output unit 210, the control unit 220 provides a first charge signal. The power output unit 210 provides a preset charge power to the rechargeable battery according to the first charge signal. Thus, a first charge process can be executed. When the rechargeable battery is reconnected to the power output unit 210, the control unit 220 provides a second charge signal. The power output unit 210 provides a first adjustable charge power to the rechargeable battery according to the second charge signal. Thus, a second charge process can be executed.

The power output unit 210 provides the corresponding charge power to the rechargeable battery according to the charge signal provided by the control unit 220. Thus, the capacity of the rechargeable battery can be controlled according to the charge signal provided by the control unit 220. For example, when the charge signal received by the power output unit 210 is 5V, the power output unit 210 provides a maximum charge power (such as 29.4V) to charge the rechargeable battery. At this time period, the capacity of the rechargeable battery can arrive to 100%. If the charge signal received by the power output unit 210 is 0V, the power output unit 210 provides a charge power (such as 28.7V) to charge the rechargeable battery. At this time period, the capacity of the rechargeable battery may be 90%.

Additionally, when the first or the second charge process is being executed, the power output unit 210 may not continuously provide the preset charge power or the first adjustable charge power to the rechargeable battery. Taking the first charge process as an example, when the first charge process is executed, the power output unit 210 provides the preset charge power to the rechargeable battery during a first period and stops providing the preset charge power to the rechargeable battery during a second period. Similarly, when the second charge process is executed, the power output unit 210 provides the first adjustable charge power to the rechargeable battery during a third period and stops providing the first adjustable charge power to the rechargeable battery during a fourth period.

When the rechargeable battery is reconnected to the power output unit 210, the measurement unit 230 is capable of obtaining a use state of the rechargeable battery. In one embodiment, the control unit 220 directly generates charge power to the rechargeable battery according to the use state. In another embodiment, the control unit 220 provides the corresponding charge signal according to the use state such that the power output unit 210 provides the corresponding charge power.

The duration of the third period is dependent upon the use state. For example, when the use state (duration of executing the first charge process) exceeds a preset value, the duration of providing the first adjustable charge power is longer than the duration of providing the preset charge power. When the use state is less than the preset value, the duration of providing the first adjustable charge power is shorter than the duration of providing the preset charge power.

In one embodiment, the control unit 220 adjusts the preset charge power according to the use state and provides the adjusted preset charge power to serve as the first adjustable charge power. In another embodiment, the control unit 220 adjusts the first charge signal according to the use state and provides the adjusted result to serve as the second charge signal. Thus, the power output unit 210 generates the first adjustable charge power according to the second charge signal.

Assuming that the rechargeable battery comprises a first charge capacity after the first charge process and comprises a second charge capacity after the second charge process. When the use state of the rechargeable battery is less than a first preset level, the power output unit 210 provides the first adjustable charge power to the rechargeable battery according to the second charge signal provided by the control unit 220. Thus, the second charge capacity exceeds the first charge capacity.

Alternatively, when the use state exceeds a second preset level, the first adjustable charge power provided by the power output unit 210 directs the second charge capacity to be lower than the first charge capacity. Although the second charge capacity is lower than the first charge capacity, the second charge capacity still exceeds a minimum charge level. Additionally, the first preset level can equal to the second preset level.

The use state detected by the measurement unit 230 is the duration of executing the first charge process, the first or the second period, the remaining capacity of the rechargeable battery, the open circuit voltage (OCV) of the rechargeable battery, the charge time of the rechargeable battery or the internal impedance of the rechargeable battery. In this embodiment, the measurement unit 230 obtains a use state of the rechargeable battery before executing the second charge process. In other embodiments, the measurement unit 230 obtains a previous state of the rechargeable battery before executing the first charge process. Thus, the control unit 230 provides the second charge signal according to the use state and the previous state. For example, the control unit 230 determines the second charge signal according to a weighting average of the use state and the previous state.

The measurement unit 230 requires the corresponding modules to detect the use state. In this embodiment, the measurement unit 230 comprises a voltage measurement module 231, a remaining capacity measurement module 232, a signal control module 233 and a charge/discharge monitor module 234, but is not limited thereto. In other embodiments, one or some of the modules can be omitted or be added to the measurement unit 230.

The voltage measurement module 231 estimates the OCV of the rechargeable battery. The remaining capacity measurement module 232 estimates the remaining capacity of the rechargeable battery. The remaining capacity measurement method comprises a Coulomb counting by integral method, a Coulomb counting method combined with OCV measurement, or an internal impedance monitor method. The signal control module 233 detects whether a trigger signal is triggered or not. The charge/discharge monitor module 234 obtains a charge time of the rechargeable battery and the discharge time of the rechargeable battery. The states of the rechargeable battery comprise a charge state, a discharge state and an idle state. When the rechargeable battery is in the charge state, the current flowing into the rechargeable battery is positive. When the rechargeable battery is in the discharge state, the current flowing into the rechargeable battery is negative. When the rechargeable battery is in the idle state, the current flowing into the rechargeable battery is zero.

Referring to FIG. 2, the power output unit 210 further comprises a specific button 212. When the button 212 is pressed, a trigger signal is triggered. When the trigger signal is triggered, the control unit 220 provides the corresponding charge signal. At this time period, the power output unit 210 provides a maximum charge power or provides a higher charge power to the rechargeable battery according to the charge signal provided by the control unit 220.

For example, when the second charge process is being executed or has not been executed, if the specific button 212 is pressed, the power output unit 210 provides the maximum charge power to serve as the first adjustable charge power. In other embodiments, if the specific button 212 is pressed, the first adjustable charge power provided by the power output unit 210 exceeds the preset charge power. In some embodiments, when the second charge process is executed, the power output unit 210 provides the first adjustable charge power to the rechargeable battery. At the time period, if the specific button 212 is pressed, the first adjustable charge power is decided to be replaced by another charge power or not according to the level of the first adjustable charge power. For example, if the first adjustable charge power exceeds a preset trigger level, the power output unit 210 still provides the first adjustable charge power. If the first adjustable charge power is less than the preset trigger level, the power output unit 210 provides a new charge power to the rechargeable battery. The new charge power may exceed the first adjustable charge power.

The number of the charge process is not limited. When the rechargeable battery is connected to the power output unit 210, a charge process is executed from the rechargeable battery. For example, after the second process, if the rechargeable battery is reconnected to the power output unit 210, the power output unit 210 provides a second adjustable charge power to the rechargeable battery to execute a third process.

Before executing the second charge process, if the pressed number of the specific button 212 reaches a preset number during a preset time period, the control unit 220 provides a maximum charge power to serve as the first and the second adjustable charge power. The rechargeable battery is charged according to the first and the second adjustable charge power. When the specific button 212 is not pressed, the control unit 220 provides the corresponding charge signal or the corresponding charge power according to the use state to charge the rechargeable battery.

In another embodiment, the power output unit 210 further comprises an incremental button (not shown). When the incremental button is pressed, the power output unit 220 increases the charge power provided to the rechargeable battery. In one embodiment, the range of increasing the charge power is dependent upon the use state of the rechargeable battery.

The charge power received by the rechargeable battery is determined by the use state. Since the use state is dependent upon the characteristics of the rechargeable battery, the operating lifespan of the rechargeable battery is increased. Additionally, the control unit 220 adjusts the charge power received by the rechargeable battery according to the requirements of users. Thus, satisfying individual user requirements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging method, comprising:
providing a preset power to a rechargeable battery when the rechargeable battery is connected to a charger for execution of a first charge process;
obtaining a use state of the rechargeable battery and providing a first adjustable charge power to the rechargeable battery when the rechargeable battery is reconnected to the charger for execution of a second charge process; and
detecting a trigger signal, wherein before the second charge process, if the trigger signal is triggered, a maximum charge power is served as the first adjustable charge power,
wherein after the second charge process, if the rechargeable battery is reconnected to the charger, a second adjustable charge power is provided to the rechargeable battery for execution of a third charge process, and
wherein before the second charge process, if the number of trigger signal triggering reaches a preset number, the maximum charge power is served as the first and the second adjustable charge power.

2. The charging method as claimed in claim 1, wherein the preset power and the first adjustable charge power are current or voltage.

3. The charging method as claimed in claim 1, wherein the use state is the duration of the first charge process.

4. The charging method as claimed in claim 1, wherein during a first period of the first charge process, the rechargeable battery is charged and during a second period of the first charge process, the rechargeable battery is not charged.

5. The charging method as claimed in claim 4, wherein the use state is the duration of the first period or the second period.

6. The charging method as claimed in claim 4, wherein during a third period of the second charge process, the rechargeable battery is charged and during a fourth period of the second charge process, the rechargeable battery is not charged.

7. The charging method as claimed in claim 6, wherein the duration of the third period is dependent upon the use state.

8. The charging method as claimed in claim 7, wherein the duration of the third period exceeds the duration of the first period when the use state is higher than a preset value, and the duration of the third period is less than the duration of the first period when the use state is less than the preset value.

9. The charging method as claimed in claim 1, wherein the first adjustable charge power is dependent upon the use state.

10. The charging method as claimed in claim 1, further comprising:
detecting the rechargeable battery for obtaining a previous state before the first charge process.

11. The charging method as claimed in claim 10, wherein the first adjustable charge power is dependent upon the use state and the previous state.

12. The charging method as claimed in claim 11, wherein the first adjustable charge power is determined by a weighting average of the use state and the previous state.

13. The charging method as claimed in claim 10, wherein the rechargeable battery comprises a first charge capacity after the first charge process and the rechargeable battery comprises a second charge capacity after the second charge process.

14. The charging method as claimed in claim 13, further comprising:
adjusting the preset charge power according to the use state for generating the first adjustable charge power.

15. The charging method as claimed in claim 14, wherein the second charge capacity exceeds the first charge capacity when the use state is less than a first preset level and the second charge capacity is less than the first charge capacity when the use state exceeds a second preset level.

16. The charging method as claimed in claim 15, wherein the second charge capacity exceeds a minimum charge level.

17. The charging method as claimed in claim 15, wherein the first preset level equal to the second preset level.

18. The charging method as claimed in claim 1, wherein the use state is a remaining capacity of the rechargeable battery, a open circuit voltage (OCV) of the rechargeable battery, a charge time of the rechargeable battery or an internal impedance of the rechargeable battery.

19. A charging system, comprising:
a power output unit;
a control unit triggering the power output unit for execution of a first charge process when a rechargeable battery is connected to the power output unit; and
an measurement unit obtaining a use state of the rechargeable battery when the rechargeable battery is reconnected to the power output unit, wherein when the use state is obtained, the control unit once again triggers the power output unit for execution of a second charge process, wherein when the rechargeable battery is connected to the power output unit, the control unit provides a first charge signal, the power output unit provides a preset charge power to the rechargeable battery according to the first charge signal for execution of the first charge process, and when the rechargeable battery is reconnected to the power output unit, the control unit provides a second charge signal, the power output unit provides a first adjustable charge power to the rechargeable battery according to the second charge signal for execution of the second charge process, wherein the measurement unit further detects a trigger signal, wherein before the second charge process, if the trigger signal is triggered, the power output unit provides a maximum charge power to serve as the first adjustable charge power, wherein after the second charge process, if the rechargeable battery is reconnected to the power output unit, the power output unit provides a second adjustable charge power to the rechargeable battery for execution of a third charge process, and wherein before the second charge process, if the number of trigger signal triggering reaches a preset number, the power output unit provides the maximum charge power to serve as the first and the second adjustable charge power.

20. The charging system as claimed in claim 19, wherein the preset charge power and the first adjustable charge power are current or voltage.

21. The charging system as claimed in claim 19, wherein the use state is the duration of executing the first charge process.

22. The charging system as claimed in claim 19, wherein when the first charge process is executed, the power output unit provides the preset charge power to the rechargeable battery during a first period and stops providing the preset charge power to the rechargeable battery during a second period.

23. The charging system as claimed in claim 22, wherein the use state is the duration of the first or the second period.

24. The charging system as claimed in claim 22, wherein when the second charge process is executed, the power output unit provides the first adjustable charge power to the rechargeable battery during a third period and stops providing the first adjustable charge power to the rechargeable battery during a fourth period.

25. The charging system as claimed in claim 24, wherein the duration of the third period is dependent upon the use state.

26. The charging system as claimed in claim 25, wherein when the use state exceeds a preset value, the duration of providing the first adjustable charge power is longer than the duration of providing the preset charge power, and when the use state is lower than the preset value, the duration of providing the first adjustable charge power is shorter than the duration of providing the preset charge power.

27. The charging system as claimed in claim 19, wherein the control unit provides the first adjustable charge power according to the use state.

28. The charging system as claimed in claim 19, wherein before the first charge process, the measurement unit detects the rechargeable battery for obtaining a previous state.

29. The charging system as claimed in claim 28, wherein the control unit provides the second charge signal according to the use state and the previous state.

30. The charging system as claimed in claim 29, wherein the control unit determines the second charge signal according to a weighted average of the use state and the previous state.

31. The charging system as claimed in claim 28, wherein after the first charge process, the rechargeable battery comprises a first charge capacity and after the second charge process, the rechargeable battery comprises a second charge capacity.

32. The charging system as claimed in claim 31, wherein the control unit adjusts the first charge signal for generating the second charge signal according to the use state.

33. The charging system as claimed in claim 32, wherein when the use state is less than a first preset level, the second charge capacity exceeds the first charge capacity, and when the use state exceeds a second preset level, the second charge capacity is less than the first charge capacity.

34. The charging system as claimed in claim 33, wherein the second charge capacity exceeds a minimum charge level.

35. The charging system as claimed in claim 33, wherein the first preset level equals to the second preset level.

36. The charging system as claimed in claim 19, wherein the measurement unit detects remaining capacity of the rechargeable battery, an open circuit voltage of the rechargeable battery, a charge time of the rechargeable battery or an internal impedance of the rechargeable battery for obtaining the use state.

* * * * *